Figure 1:
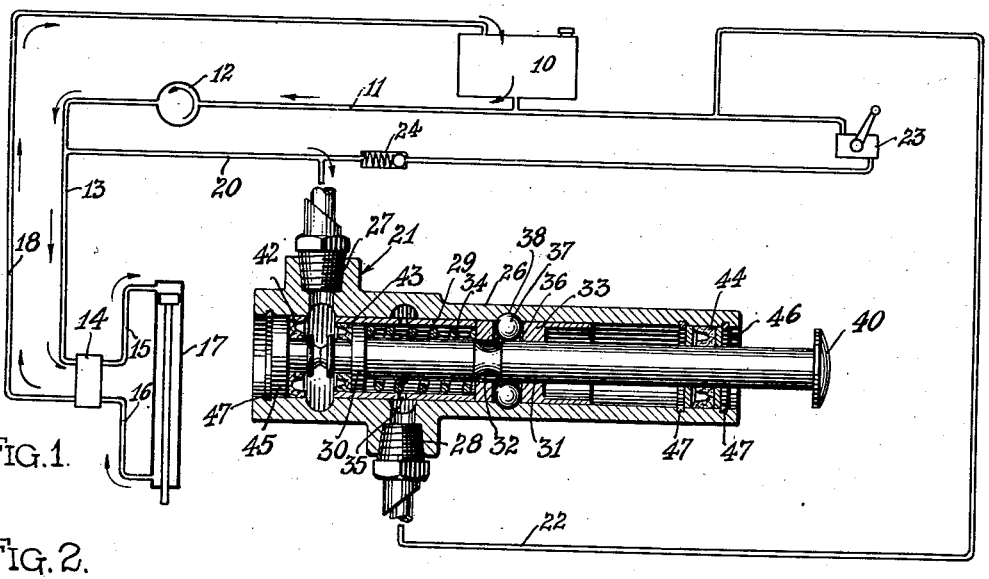

Oct. 15, 1940.　　　O. L. WOODSON　　　2,217,880

UNLOADING RELIEF VALVE

Filed June 3, 1938

INVENTOR
OMER L. WOODSON.
BY
ATTORNEY

Patented Oct. 15, 1940

2,217,880

UNITED STATES PATENT OFFICE 2,217,880

UNLOADING RELIEF VALVE

Omer L. Woodson, Kenmore, N. Y., assignor to Curtiss-Wright Corporation, a corporation of Delaware Application June 3, 1938, Serial No. 211,498

4 Claims. (Cl. 137—53)

This invention relates to unloading relief valves, being particularly adapted for use in hydraulic or pneumatic systems wherein the valve opens after reaching a predetermined pressure, after which the valve remains open, although the pressure in the system may drop far below the initial pressure required for valve opening.

The principal object of the invention is to provide a by-pass valve which completely releases the load from the hydraulic system when a predetermined pressure has been reached.

A further object is to provide a by-pass which, when opened at a predetermined pressure, will not return to a working position automatically when the pressure drops, thereby permitting a pressure pump to run under no load after said predetermined pressure has been attained.

An additional object is to provide a valve of the character indicated which is positive in action, cheap to manufacture, and dependable in operation.

A valve of the character herein described is particularly adapted for use in modern aircraft, many of which are equipped with hydraulic systems for operating various controls, retractable landing gears and the like. Initially, manually operated hydraulic pumps were used for operating these systems, and the manual control, in the hands of the operator, was sensitive to completion of the control function, whereupon operation of the manual pump was terminated. However, with aircraft being built in larger and still larger sizes, power driven pumps for hydraulic systems are necessary to provide quicker operation of the controls. The normal working pressure in pumps for this service is around four hundred to six hundred pounds per square inch, and relief valves, usually set at about seven hundred fifty pounds per square inch, are provided in the system to prevent development of excessive pump pressures after the controlled apparatus has moved to its limiting position and before the pump has been stopped. It will be appreciated that with the conventional relief valve set at a limiting pressure, the pump must continue to work against this pressure even after its useful function has ceased, thus using up excess power and causing undue wear and tear on the pump. Accordingly, the valve of this invention is designed to unload a pressure system at a predeterminate pressure, after which the pressure may fall practically to zero, the valve being provided with a re-setting device which may be operated manually.

Figure 2:
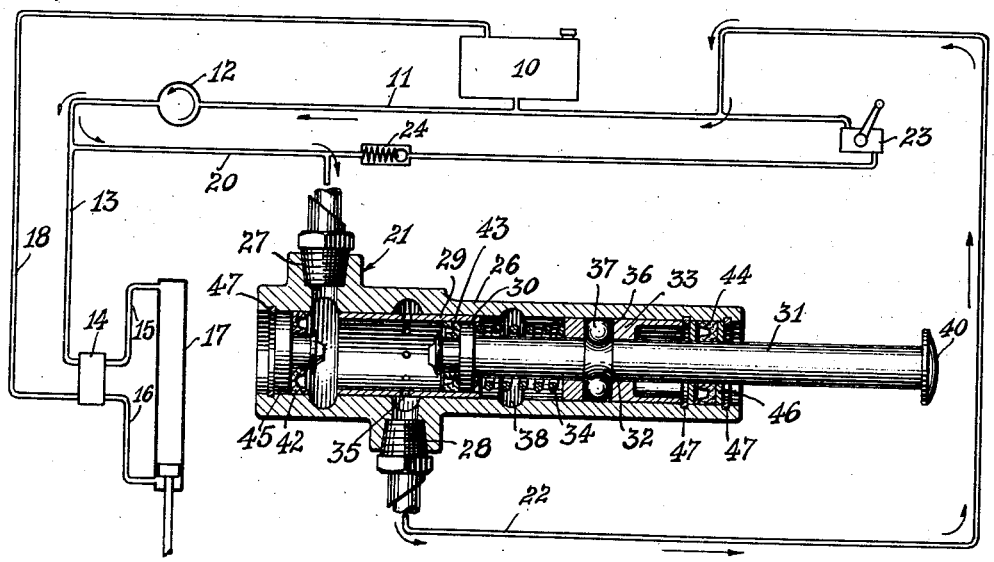
Figure 3:
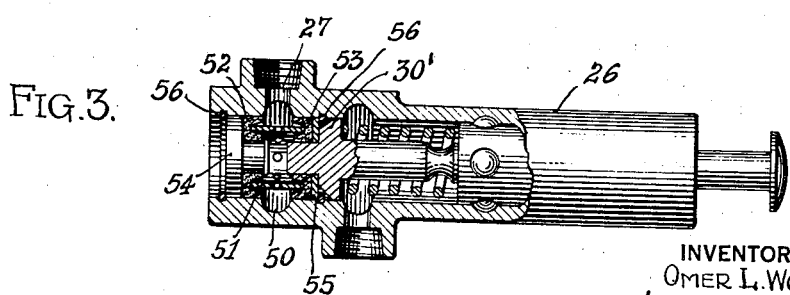

Further objects and advantages will be apparent from a reading of the annexed specification and claims, together with an examination of the accompanying drawing, in which:

Figs. 1 and 2 are diagrams of a hydraulic system incorporating the valve of this invention, the valve being shown in longitudinal section in different positions of adjustment in respective figures, and Fig. 3 is an elevation, partly in longitudinal section, showing an alternative construction for the valve.

Referring to Figs. 1 and 2, I show a fluid reservoir 10 from which a conduit 11 leads to a motor driven pump 12, the latter delivering through a line 13 to a switching valve unit 14 connected through conduits 15 and 16 to a hydraulic motor 17 shown as a piston-cylinder unit. From the valve unit 14 a return line 18 issues, the latter being connected to the top of the reservoir 10. A by-pass line 20, communicating with the conduit 13, opens to a relief valve unit designated in its entirety as 21, the exit side of the relief valve connecting through a conduit 22 back to the conduit 11. As an alternate means of operating the hydraulic system, should the motor-driven pump 12 be inoperative, a manual pump 23 connects to the reservoir 10 and through a check valve 24 to the line 20 and thence to the valve unit 14, the check valve 24 being provided to prevent motoring of the manual pump 23 when the power pump 12 is in operation.

The relief valve 21 comprises a cylindrical housing 26, having an inlet opening 27 toward one end, and an exit opening 28 longitudinally spaced from the opening 27. Within the housing 26, which may be made from light weight material, is a steel sleeve 29 forming a cylinder for a piston valve 30 integral with a valve stem 31 having an annular groove 32 formed therein. An abutment sleeve 33 is slidably fitted within the housing 26 and a spring 34, bearing at its respective ends on the piston 30 and on the sleeve 33, serves to hold the piston against displacement during moderate pressure conditions in the hydraulic system. If excessive pressure is built up, the piston 30 is displaced to the right, as shown, uncovering ports 35 in the sleeve 29, which ports communicate with the exit opening 28.

The sleeve 33 is provided with radial drillings 36 within which are seated ball detents 37 normally engaged in an annular groove 38 formed in the housing, the balls providing a lock between the sleeve 33 and the housing 26, and being held in the locking position by the engagement of the balls with the stem 31. As the piston 30 is displaced to the right, the stem groove 32 registers with the balls 37, whereupon the balls may drop into the groove 32, releasing the sleeve 33 from the housing 26. The pressure on the piston valve thereupon moves the whole assembly of piston, stem, spring, and sleeve to the right, as shown in Fig. 2, completely unloading the valve and holding the stem 31 in fixed relation relative to the sleeve 33, and holding the spring 34 in a compressed condition. Thus, the valve remains open, unloading the pressure from the hydraulic system until such time as the valve is re-set. In this condition of the valve, the pump 12 may idle at substantially no load until such time as the operator stops the pump, since it is no longer serving a useful function.

Before the system can again be operated, the operator must re-set the valve 21, which he may do by pressing the stem 31, through the means of a button 40 on the end of the stem, toward the left, whereby the drillings 36 in the sleeve 33 are aligned with the groove 38 and spring pressure acting on the stem 31 forces the balls 37 outwardly into engagement with the groove 38, locking the sleeve to the housing and permitting the piston valve 30 to resume a position in which communication between the inlet opening 27 and the outlet opening 28 is cut off.

In the construction of the valve system, it will be noted that annular packings 42, 43 and 44, backed up respectively by a washer 45, the piston 30, and a washer 46, close off the cylindrical bore of the housing 26 and seal the valve against fluid leakage. The washers 45 and 46 are located in their appropriate axial positions by means of split snap rings 47 assembled in appropriate grooves in the bore of the housing 26.

In Fig. 3, I show an alternative form of valve construction, the operation of which is identical with that above described. In this instance, however, the inlet opening 27 registers with an annulus 50 separated from the chamber of the piston valve 30' by a radially drilled ring 51 floating between packings 52 and 53 respectively retained in the bore by washers 54 and 55 held in place by snap rings 56. The head of the piston valve 30' may enter within the packing 53, so that under normal operating pressure conditions, the packings 52 and 53 prevent leakage of pressure fluid past the piston. In this case, both packings 52 and 53 are fixed within the housing 26, whereas, in the embodiment first described, the packing 42 only is fixed and the packing 43 moves with the piston.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In an unloading relief valve, a cylindrically bored housing having an inlet opening toward one end and an outlet opening spaced from said end, a piston valve in fitting engagement with the surface of said bore, axially movable to open or cut off communication between said openings, said valve having a stem including an annular groove, an abutment sleeve embracing said stem and slidable axially in said bore the sleeve including a radial opening, a detent in said radial opening movable into locking engagement with said stem groove, and into locking engagement with the housing bore, and a compression spring between the piston valve and said abutment urging said valve to a closing position when the sleeve detent is locked in the bore, said stem being moved in response to excess pressure to receive said detent in its groove, to free the sleeve from the bore and to unload the valve spring.

2. In an unloading relief valve, a cylindrically bored housing having longitudinally spaced inlet and exit openings, a piston valve slidable in the bore to open and cut off communication between said openings, said cylindrical bore having a recess spaced from the openings and said piston valve having a stem including a recess, a sleeve between the stem and bore wall, a radially movable detent in the sleeve for locking either the stem to the sleeve or the sleeve to the bored housing in virtue of detent engagement respectively with the stem recess or the bore recess, and resilient means abutting at its respective ends on the piston valve and the sleeve for urging them apart.

3. An unloading relief valve comprising a housing having an axial bore, a valve having a stem extending into said bore, a sleeve between the stem and bore, a spring embracing said stem and extending between the valve and sleeve, the sleeve forming a spring abutment, said stem, spring and sleeve being slidable in the bore, said stem and the wall of said bore having recesses therein, and detents carried by the sleeve engageable either with the stem recess or the bore wall recess to respectively lock the sleeve to the stem or the sleeve to the housing.

4. In an unloading relief valve, a housing having inlet and outlet openings, a valve axially movable to open and close communication between said openings, said valve having a stem and said housing a bore within which said stem lies, a spring embracing said stem, a sleeve freely movable in the bore and on the stem against one end of which said spring abuts, a detent carried by and substantially radially movable in the sleeve and projecting beyond the inner or outer surface thereof, and recesses formed in the bore wall and valve stem with either of which said detent is engageable to effect locking of the sleeve to the bore wall or stem.

OMER L. WOODSON.